United States Patent
Kanemoto et al.

(10) Patent No.: US 7,372,926 B2
(45) Date of Patent: May 13, 2008

(54) RADIO RECEIVER APPARATUS

(75) Inventors: Hideki Kanemoto, Yokosuka (JP); Hidetoshi Suzuki, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 539 days.

(21) Appl. No.: 10/525,564

(22) PCT Filed: Jun. 25, 2004

(86) PCT No.: PCT/JP2004/009376

§ 371 (c)(1), (2), (4) Date: Feb. 25, 2005

(87) PCT Pub. No.: WO2005/002088

PCT Pub. Date: Jan. 6, 2005

(65) Prior Publication Data

US 2006/0165156 A1    Jul. 27, 2006

(30) Foreign Application Priority Data

Jun. 26, 2003  (JP)  ............................. 2003-182941
Sep. 12, 2003  (JP)  ............................. 2003-320997

(51) Int. Cl.
*H04B 7/10* (2006.01)

(52) U.S. Cl. .................. 375/347; 375/316; 375/145; 455/132; 455/296

(58) Field of Classification Search ............... 375/145, 375/347, 316; 455/132, 296
See application file for complete search history.

(56) References Cited

U.S. PATENT DOCUMENTS 5,999,560 A    12/1999  Ono 6,195,343 B1 *  2/2001  Watanabe .................. 375/145
6,628,733 B1    9/2003  Tomiyoshi et al.

(Continued)

FOREIGN PATENT DOCUMENTS

JP    1188247    3/1999

(Continued)

OTHER PUBLICATIONS

Modeling frame synchronization for UMTS high-speed downlink packet access Lin, P.; Yi-Bing Lin; Chlamtac, I.; Vehicular Technology, IEEE Transactions on vol. 52, Issue 1, Jan. 2003 pp. 132-141.*

(Continued)

*Primary Examiner*—Shuwang Liu
*Assistant Examiner*—Michael R Neff
(74) *Attorney, Agent, or Firm*—Dickinson Wright, PLLC (57) ABSTRACT

In order to perform diversity reception efficiently without increasing the scale of the apparatus, when the total number of simultaneously connected cells has reached N cells including an HSDPA serving cell a control section 104 keeps a switch 103 connecting a buffer 102-1 to a despreading section 105, and conversely, when the total number of simultaneously connected cells has not reached N cells including an HSDPA serving cell, after completion of despreading and delay profile generation for the simultaneously connected cells performed for the received signal of an antenna #1, control section 104 switches switch 103 to connect a buffer 102-2 to despreading section 105. By means of this switching control, diversity reception is performed for an HSDPA serving cell only when the total number of simultaneously connected cells has not reached N and there are free resources.

8 Claims, 10 Drawing Sheets

U.S. PATENT DOCUMENTS

| | | | |
|---|---|---|---|
| 7,043,273 B2* | 5/2006 | Sarresh et al. | 455/562.1 |
| 2002/0085503 A1* | 7/2002 | Hulyalkar et al. | 370/252 |
| 2002/0181628 A1* | 12/2002 | Iochi et al. | 375/347 |
| 2004/0160923 A1* | 8/2004 | Nobukiyo et al. | 370/335 |

FOREIGN PATENT DOCUMENTS

| | | |
|---|---|---|
| JP | 2000151486 | 5/2000 |
| JP | 200324528 | 11/2000 |
| JP | 2001168780 | 6/2001 |

OTHER PUBLICATIONS

PCT International Search Report dated Oct. 26, 2004.
3GPP TS25.133 V5.7.0 (Jun. 2003), Release 5, pp. 18-20.

* cited by examiner

RADIO RECEIVER APPARATUS

TECHNICAL FIELD

The present invention relates to a radio receiving apparatus that performs diversity reception.

BACKGROUND ART

Conventionally, in a radio receiving apparatus that performs diversity reception, the processing system that performs synchronization processing such as path detection requires a plurality of branches coordinated with antennas. For example, in order to perform dual-branch diversity reception, two synchronization processing systems are necessary, and the synchronization processing resources required are double those of single-branch reception (see, for example, Laid-open Japanese Patent Publication No. 2000-324528).

With regard to synchronization processing, 3GPP TS25.133 stipulates that the possible number of simultaneous connections must correspond to 6 RLs (Radio Links) (that is, a mobile station apparatus must be able to receive signals of 6 cells simultaneously). Therefore, if an above-described conventional radio receiving apparatus is configured simply in accordance with 3GPP stipulations, a total of 12 synchronization processing systems are necessary in order to perform dual-branch diversity reception, the scale of the apparatus is increased, and manufacturing costs are high.

DISCLOSURE OF INVENTION

It is an object of the present invention to provide a radio receiving apparatus that can perform diversity reception efficiently without increasing the scale of the apparatus.

In order to achieve the above-described object, a radio receiving apparatus of the present invention has a configuration comprising a first antenna and a second antenna that receive a radio signal, a despreader that despreads the radio signal to obtain a despreading result, a generation section that generates a delay profile based on the despreading result, a detector that performs path detection based on the delay profile, and a switching controller that inputs only the radio signal received by the first antenna to the despreader when the number of simultaneously connected cells has reached the simultaneously connectable number, and inputs both the radio signal received by the first antenna and the radio signal received by the second antenna to said despreader when the number of simultaneously connected cells has not reached the simultaneously connectable number. According to this configuration, diversity reception is performed only when the number of simultaneous connections has not reached the simultaneously connectable number, enabling diversity reception to be performed efficiently without increasing the scale of the apparatus.

BEST MODE FOR CARRYING OUT THE INVENTION

With reference now to the accompanying drawings, embodiments of the present invention will be explained in detail below.

Embodiment 1

Figure 1:
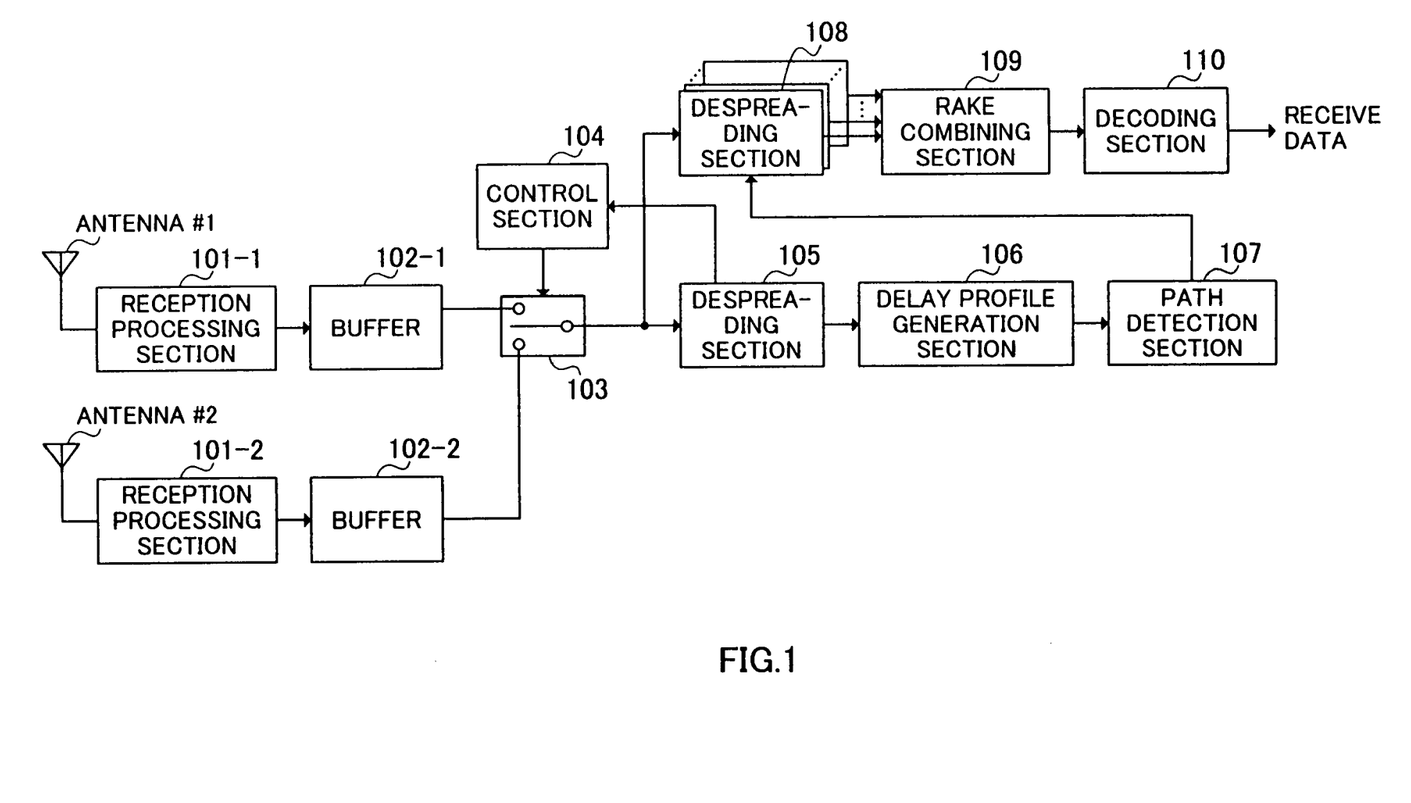
FIG. 1 is a block diagram showing the configuration of a radio receiving apparatus according to Embodiment 1 of the present invention.

FIG. 1 is a block diagram showing the configuration of a radio receiving apparatus according to Embodiment 1 of the present invention. The radio receiving apparatus in FIG. 1 performs diversity reception using an antenna #1 and antenna #2. This radio receiving apparatus is used installed in a mobile station apparatus of a mobile communication system or the like.

A signal received by antenna #1 undergoes predetermined radio processing such as down-conversion by a reception processing section 101-1, and is then stored in a buffer 102-1. A signal received by antenna #2 undergoes predetermined radio processing such as down-conversion by a reception processing section 101-2, and is then stored in a buffer 102-2. Here, antenna #2, reception processing section 101-2, and buffer 102-2 are provided specifically for HSDPA (High Speed Downlink Packet Access) diversity reception. It is assumed that a mobile station apparatus equipped with the radio receiving apparatus in FIG. 1 is currently located in a cell that provides HSDPA service (an HSDPA serving cell) Thus, an HSDPA serving cell signal (HSDPA signal) is included both in a signal received by antenna #1 and in a signal received by antenna #2. HSDPA signals include HS-SCCH (High Speed-Shared Control Channel) signal, HS-PDSCH (High Speed-Physical Downlink Shared Channel) signal, CPICH (Common Pilot Channel) signal, DPCH (Dedicated Physical Channel) signal in the HSDPA serving cell.

A switch 103 is subjected to switching control by a control section 104, and the received signal stored in buffer 102-1 or buffer 102-2 is input to a despreading section 105 and despreading sections 108. The switching control will be described later herein. Despreading section 105 performs despreading on the input received signal, and inputs the despreading result to a delay profile generation section 106. Delay profile generation section 106 generates a delay profile from the despreading result, and inputs this delay profile to a path detection section 107. Path detection section 107 detects a path whose level is greater than or equal to a predetermined threshold value from the delay profile, and inputs a signal indicating the path location to despreading sections 108. Despreading section 105, delay profile generation section 106, and path detection section 107 make up a synchronization processing section.

A number of despreading sections 108 is provided equivalent to the receivable number of paths, and despreading is performed for an input received signal in accordance with the timing of the path location detected by path detection section 107. After despreading, the respective path signals undergo RAKE combining by a RAKE combining section 109. After RAKE combining, the resulting signal undergoes error correction decoding by a decoding section 110, as a result of which receive data is obtained.

As shown in FIG. 1, in this embodiment, only a single-branch synchronization processing section (comprising despreading section 105, delay profile generation section 106, and path detection section 107) is provided, and dual-branch synchronization processing is performed by this single-branch synchronization processing section. By performing time division operation of this synchronization processing section, it is possible to process received signals of a plurality of cells.

Next, switching control performed by control section 104 will be described using FIG. 2 and FIG. 3. In this description, the simultaneously connectable number of cells is designated N. The synchronization processing section repeats a series of synchronization processes in a predetermined cycle (in FIG. 2 and FIG. 3, two frames).

Figure 2:
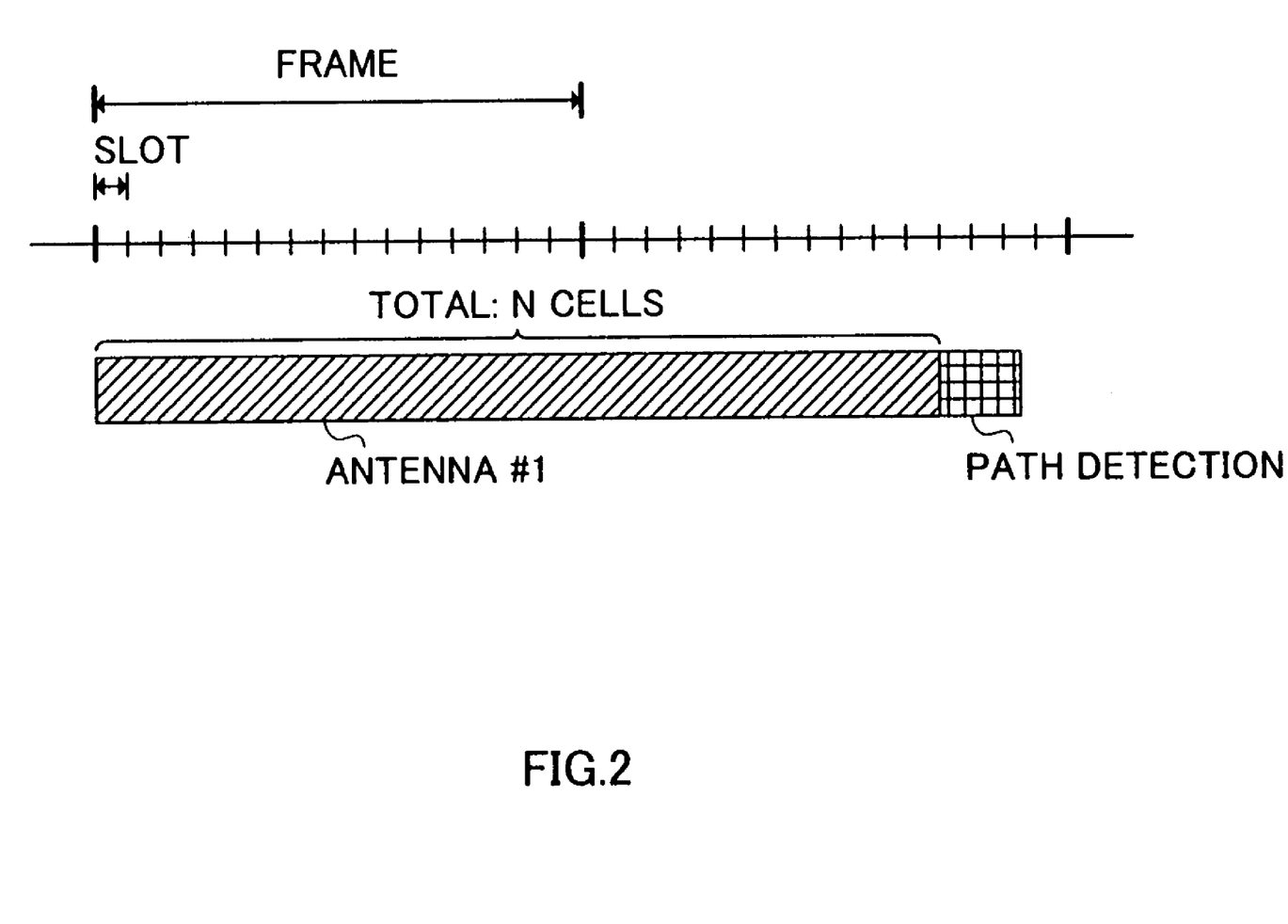
FIG. 2 is a drawing showing the operation of a radio receiving apparatus according to Embodiment 1 of the present invention.

When the total number of simultaneously connected cells has reached N cells including an HSDPA serving cell, as shown in FIG. 2, control section 104 determines that there is no vacancy in the synchronization processing section resources and keeps switch 103 connecting buffer 102-1 to despreading section 105. After despreading and delay profile generation have been completed for N cells, path detection is performed. Thus, in this case, diversity reception is not performed since synchronization processing is performed only on the signal received by antenna #1. That is to say, diversity reception is not performed when the total number of simultaneously connected cells reaches N and there are no free resources in the synchronization processing section.

Figure 3:
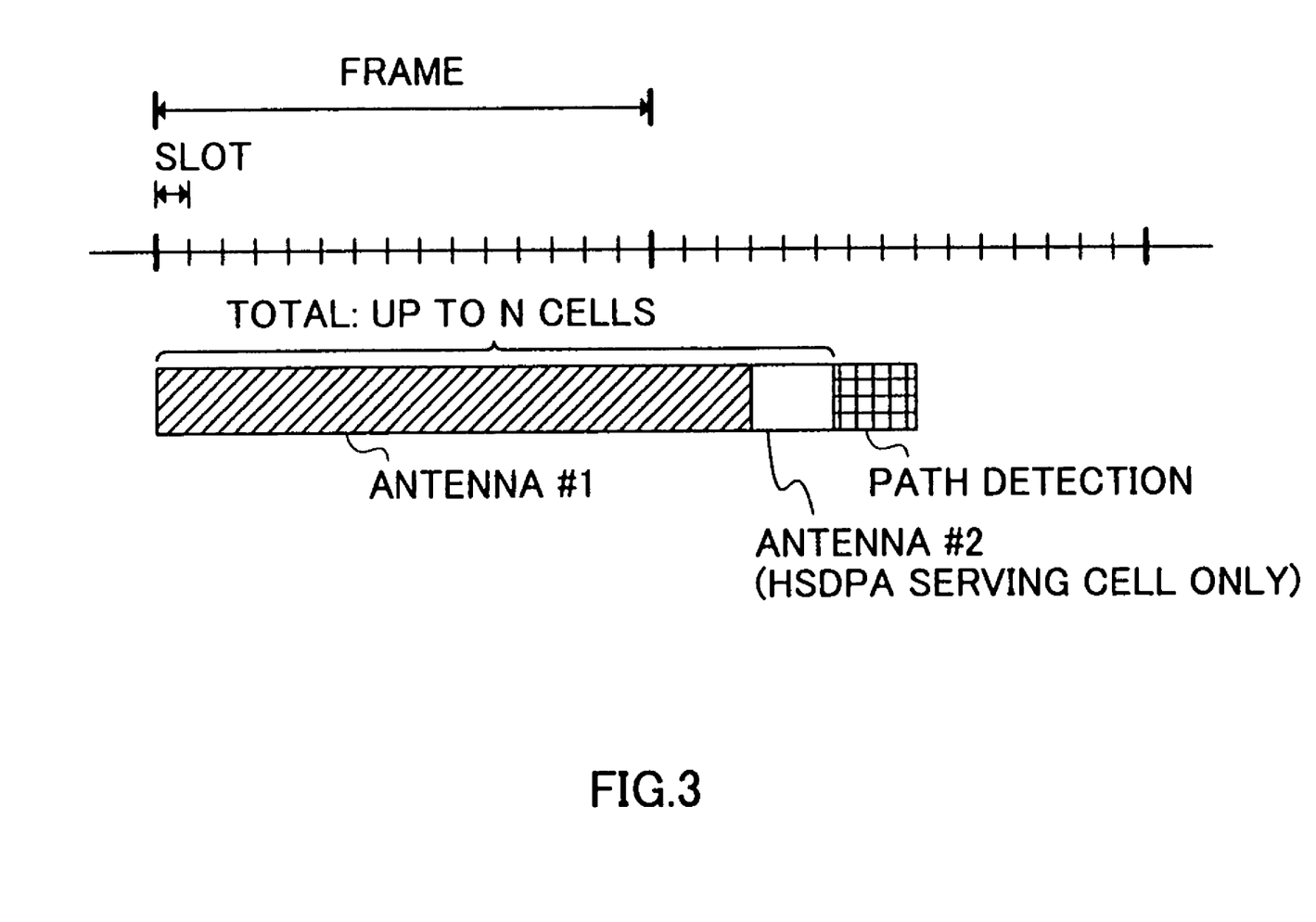
FIG. 3 is a drawing showing the operation of a radio receiving apparatus according to Embodiment 1 of the present invention.

On the other hand, when the total number of simultaneously connected cells has not reached N cells including an HSDPA serving cell, as shown in FIG. 3, control section 104 determines that there is vacancy in the synchronization processing section resources and, after completion of despreading and delay profile generation for the simultaneously connected cells performed for the antenna #1 received signal, switches switch 103 to connect buffer 102-2 to despreading section 105. By this means, the received signal stored in buffer 102-2 is input to despreading section 105. As antenna #2, reception processing section 101-2, and buffer 102-2 are provided exclusively for an HSDPA serving cell, as a result of this switching, despreading and delay profile generation are performed on an HSDPA signal included in the second-branch received signal received by antenna #2. Despreading and delay profile generation are performed on a CPICH signal and/or DPCH signal among HSDPA signals. Then, after despreading and delay profile generation have been completed for the second-branch HSDPA signal, path detection is performed based on the delay profile for the antenna #1 received signal and the delay profile for the antenna #2 HSDPA signal. That is to say, when the total number of simultaneously connected cells has not reached N, diversity reception is performed for an HSDPA serving cell using the free resources. Also, since an HSDPA serving cell is limited to one cell for a mobile station apparatus, the total synchronization processing time for antenna #1 and antenna #2 is less than or equal to the amount for N cells shown in FIG. 2.

Path detection by path detection section 107 is performed as follows. First, path detection section 107 detects paths whose level is greater than or equal to a predetermined threshold value as finger assignment candidate paths from the delay profiles generated for each cell by delay profile generation section 106. Then, a predetermined number of paths are assigned to fingers on a cell-by-cell basis from among the detected paths. At this time, assignment is performed up to the predetermined number in order from the path with the largest delay profile value. A different value is set for this predetermined number for each cell. For example, a predetermined number N is set for a cell other than an HSDPA serving cell, and a predetermined number N_HS greater than predetermined number N is set for an HSDPA serving cell (N<N_HS). Also, when diversity reception is performed, a predetermined number N_HS_div still greater than predetermined number N_HS is set for an HSDPA serving cell (N<N_HS<N_HS_div). Furthermore, when diversity reception is performed, paths up to predetermined number N_HS_div are assigned to fingers taking the delay profile for antenna #1 and the delay profile for antenna #2 together. When diversity reception is performed the number of paths with good reception quality that are candidates for finger assignment increases in relative terms according to the number of antennas, and therefore by setting a larger predetermined number when diversity reception is performed than when diversity reception is not performed in this way, finger assignment can be performed that makes effective use of diversity reception, and reception characteristics can be improved.

In this embodiment, when diversity reception is not performed, reception processing may be halted for antenna #2. That is to say, the operation of reception processing section 101-2 and buffer 102-2 may be halted. Halting reception processing for antenna #2 when diversity reception is not performed in this way enables power consumption to be reduced.

Thus, according to this embodiment, diversity reception is performed for an HSDPA serving cell when there are free resources in synchronization processing—that is to say, when the current number of simultaneous connections has not reached the simultaneously connectable number—and therefore diversity gain can be obtained for an HSDPA signal without increasing the number of resources required in synchronization processing. Also, since diversity reception can be performed using free synchronization processing resources, free resources can be used effectively. That is to say, according to this embodiment, diversity reception can be performed for an HSDPA serving cell efficiently without increasing the scale of the apparatus When HSDPA serving cell reception quality can be improved by diversity reception, a downlink transmission quality notification value (CQI: Channel Quality Indicator) transmitted from a mobile station apparatus to a base station apparatus is increased, allowing data transmission throughput to be improved for that mobile station apparatus.

Embodiment 2

Figure 4:
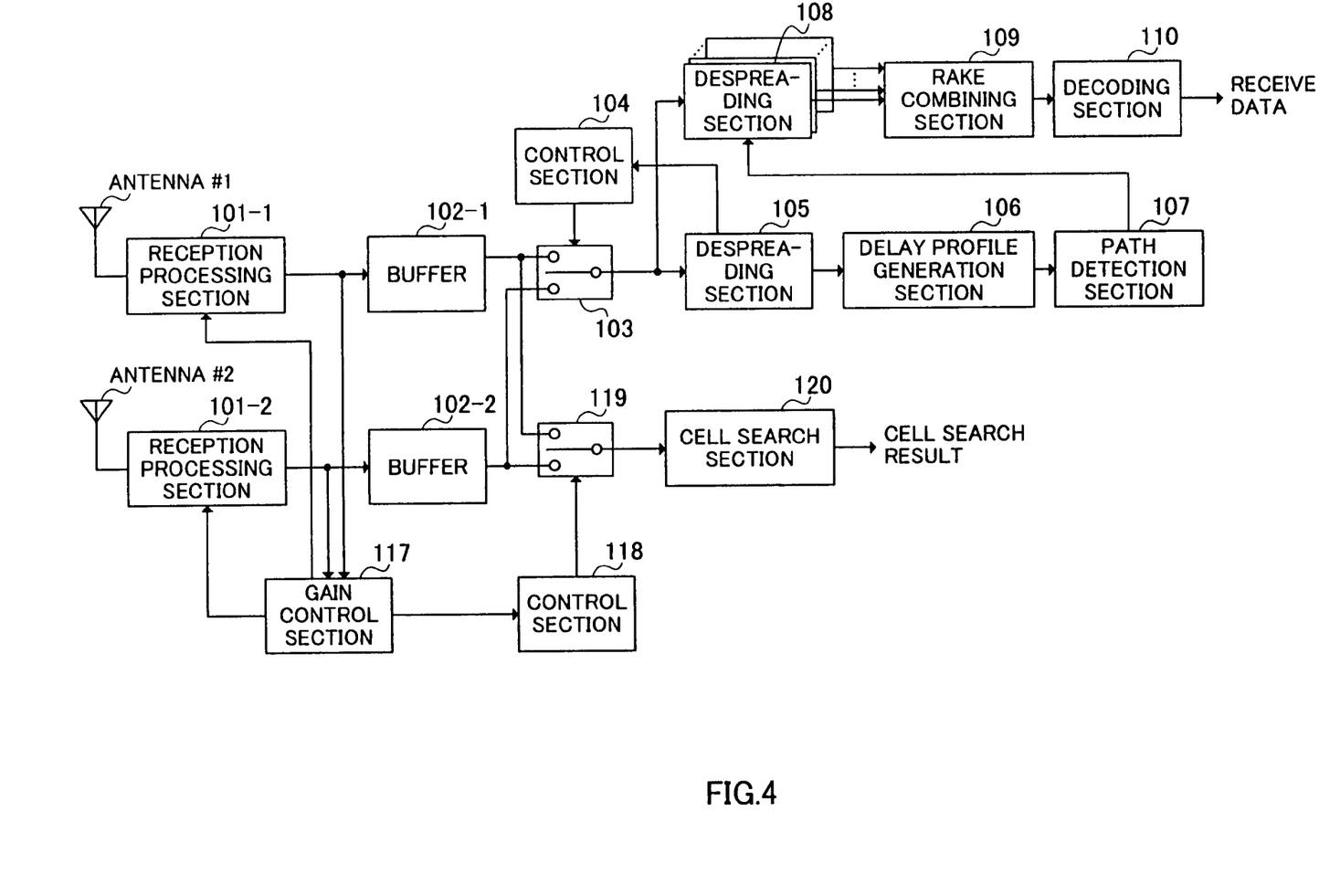
FIG. 4 is a block diagram showing the configuration of a radio receiving apparatus according to Embodiment 2 of the present invention.

FIG. 4 is a block diagram showing the configuration of a radio receiving apparatus according to Embodiment 2 of the present invention. Parts in FIG. 4 identical to those of Embodiment 1 (FIG. 1) are assigned the same codes as in Embodiment 1 (FIG. 1) and descriptions thereof are omitted.

A signal received by antenna #1 undergoes predetermined radio processing such as down-conversion by reception processing section 101-1, and is then stored in buffer 102-1 and also input to a gain control section 117. A signal received by antenna #2 undergoes predetermined radio processing such as down-conversion by reception processing section 101-2, and is then stored in buffer 102-2 and also input to gain control section 117.

Gain control section 117 measures and then compares the reception power of a signal received by antenna #1 and the reception power of a signal received by antenna #2, selects the larger reception power, and calculates a gain value of AGC (Automatic Gain Control) performed by reception processing section 101-1 and reception processing section 101-2 based on that selected reception power. Then the calculated gain value is input to both reception processing section 101-1 and reception processing section 101-2. In reception processing section 101-1 and reception processing section 101-2, received signal gain is adjusted based on the same input gain value. That is to say, the same gain value found based on the larger reception power is applied to both antenna #1 and antenna #2.

A switch 119 is subjected to switching control by a control section 118, and either the received signal stored in buffer 102-1 or the received signal stored in buffer 102-2 is input to a cell search section 120. Switching control by control section 118 is in accordance with the selection by gain control section 117. That is to say, gain control section 117 reports the selection result—that is, whether the signal with the selected larger reception power is the signal received by antenna #1 (the received signal stored in buffer 102-1) or the signal received by antenna #2 (the received signal stored in buffer 102-2)—to control section 118. In accordance with the selection result reported by gain control section 117, control section 118 selects the received signal that has the larger reception power and inputs this signal to cell search section 120. That is to say, when the reception power of the signal received by antenna #1 is larger, control section 118 connects buffer 102-1 to cell search section 120 by means of switch 119, and conversely, when the reception power of the signal received by antenna #2 is larger, control section 118 connects buffer 102-2 to cell search section 120 by means of switch 119. Cell search section 120 performs a cell search based on the input received signal, and outputs the cell search result.

Thus, according to this embodiment, AGC is simultaneously performed for antenna #1 and antenna #2 providing diversity reception based on the same gain value, so that AGC is performed in common for antenna #1 and antenna #2, as a result of which it is not necessary to take a difference in reception level between the antennas into consideration in path detection, RAKE combining, and so forth following reception processing including AGC in reception processing section 101-1 and reception processing section 101-2. Thus, it is possible to provide a configuration that is independent of whether or not diversity reception is performed in a connected cell, enabling the equipment configuration of a radio receiving apparatus to be simplified. Also, when diversity reception is applied to a cell search, by performing the cell search in accordance with a selection result by gain control section 117 as described above, diversity gain can be obtained without enlarging the equipment configuration in accordance with the number of antennas.

Furthermore, when diversity reception is not applied to a cell search, AGC is performed independently for antenna #1 and antenna #2 based on the reception power of each antenna. The same applies when diversity reception is not used for a control channel other than a traffic channel (such as a broadcast channel, for example).

Embodiment 3

Figure 5:
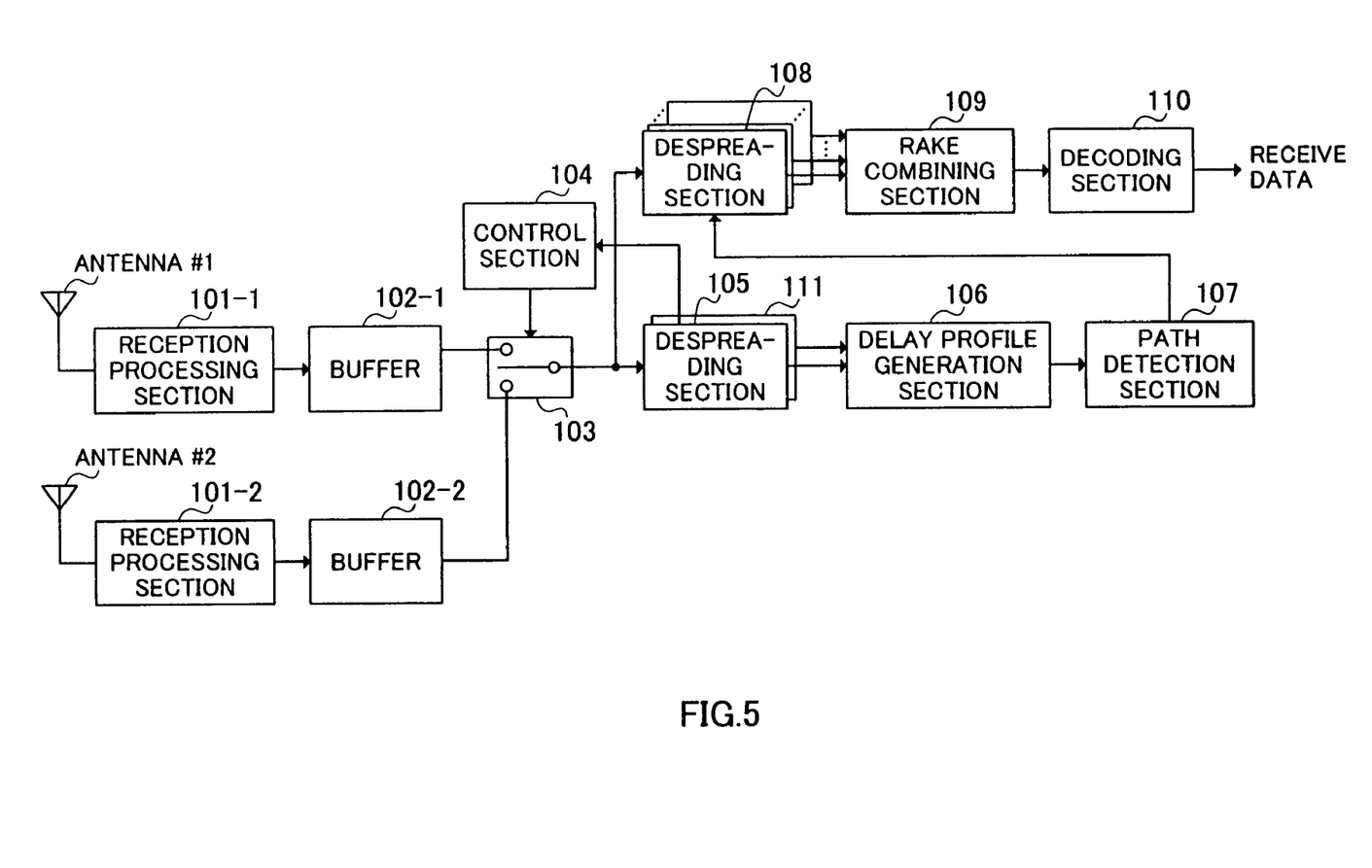
FIG. 5 is a block diagram showing the configuration of a radio receiving apparatus according to Embodiment 3 of the present invention.

FIG. 5 is a block diagram showing the configuration of a radio receiving apparatus according to Embodiment 3 of the present invention. Parts in FIG. 5 identical to those of Embodiment 1 (FIG. 1) are assigned the same codes as in Embodiment 1 (FIG. 1) and descriptions thereof are omitted.

In Embodiment 1, diversity reception is possible for an HSDPA serving cell only when there are free resources in synchronization processing—that is, only when the total number of simultaneously connected cells has not reached N cells including the HSDPA serving cell. In this embodiment, on the other hand, a despreading section 111 is provided in addition to despreading section 105, as shown in FIG. 5, so that synchronization processing is made possible for a second-branch HSDPA signal in addition to the simultaneously connected N cells. That is to say, N+1 resources are provided.

Figure 6:
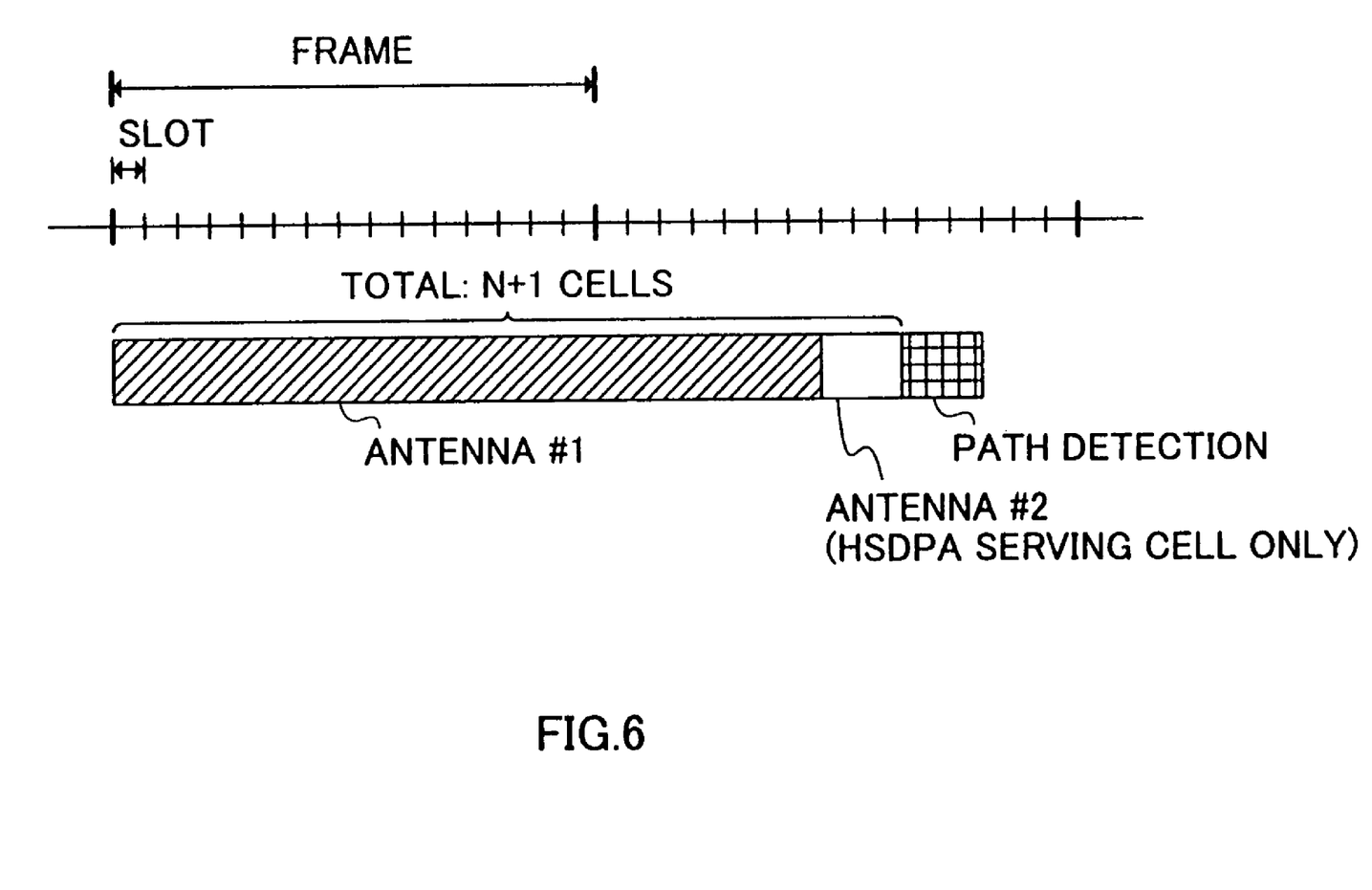
FIG. 6 is a drawing showing the operation of a radio receiving apparatus according to Embodiment 3 of the present invention.

By this means, further resources for one cell can be secured for performing diversity reception for an HSDPA serving cell even when the total number of simultaneously connected cells has reached N, as shown in FIG. 6. Thus, in this embodiment, diversity reception can be performed for an HSDPA serving cell at all times.

Embodiment 4

Figure 7:
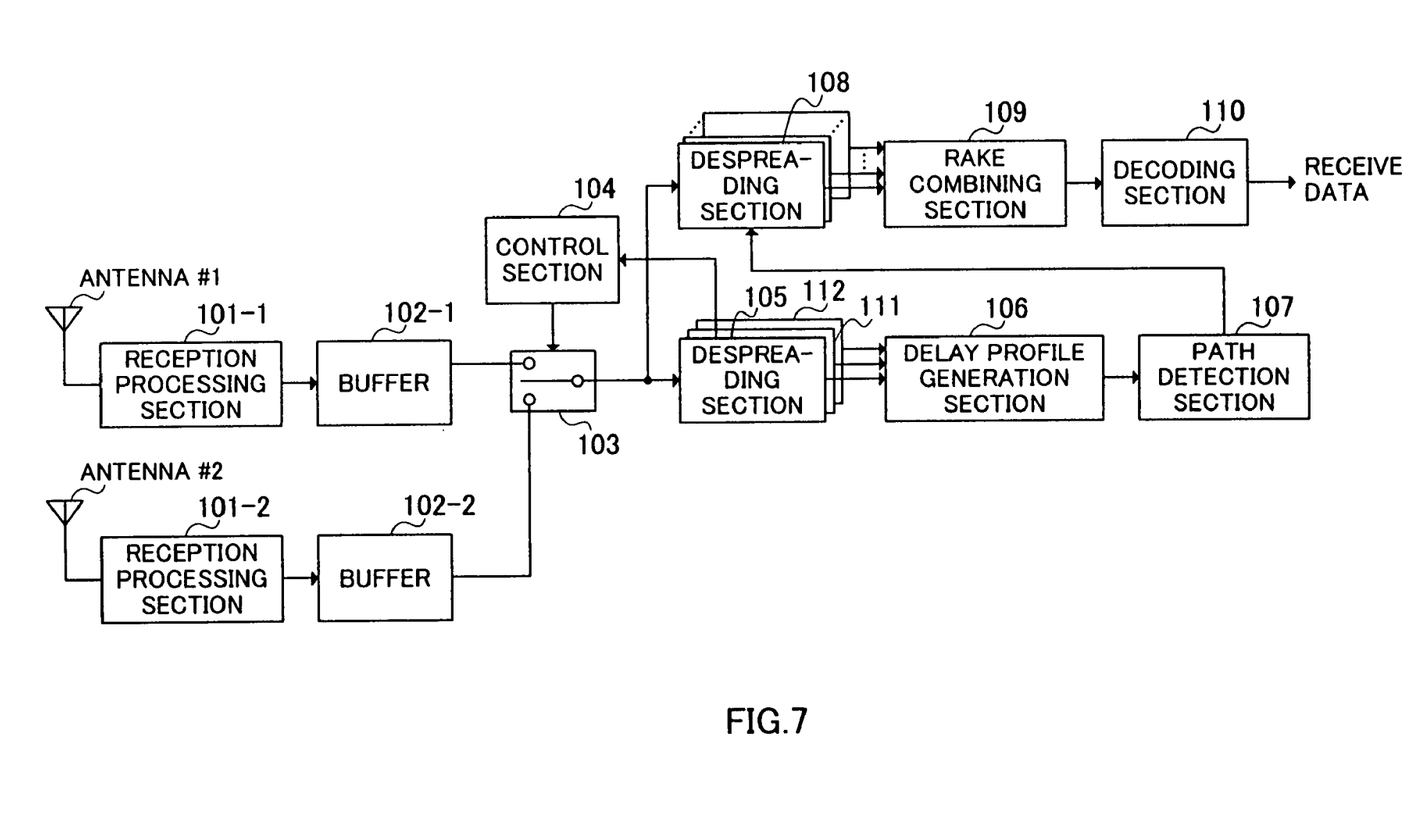
FIG. 7 is a block diagram showing the configuration of a radio receiving apparatus according to Embodiment 4 of the present invention.

FIG. 7 is a block diagram showing the configuration of a radio receiving apparatus according to Embodiment 4 of the present invention. Parts in FIG. 7 identical to those of Embodiment 1 (FIG. 1) and Embodiment 3 (FIG. 5) are assigned the same codes as in Embodiment 1 (FIG. 1) and Embodiment 3 (FIG. 5), and descriptions thereof are omitted.

In this embodiment, a despreading section 112 has further been added in the synchronization processing section, as shown in FIG. 5, so that synchronization processing is made possible for a second-branch uplink (UL) serving cell signal in addition to the simultaneously connected N cells and an HSDPA serving cell. That is to say, N+2 resources are provided. Here, an uplink serving cell is a cell that, when hybrid ARQ (Automatic Repeat request), transmission scheduling, or adaptive modulation techniques are applied to an uplink, transmits ACK (ACKnowledgment), NACK (Negative ACKnowledgment), or scheduling information for the uplink on the downlink.

Figure 8:
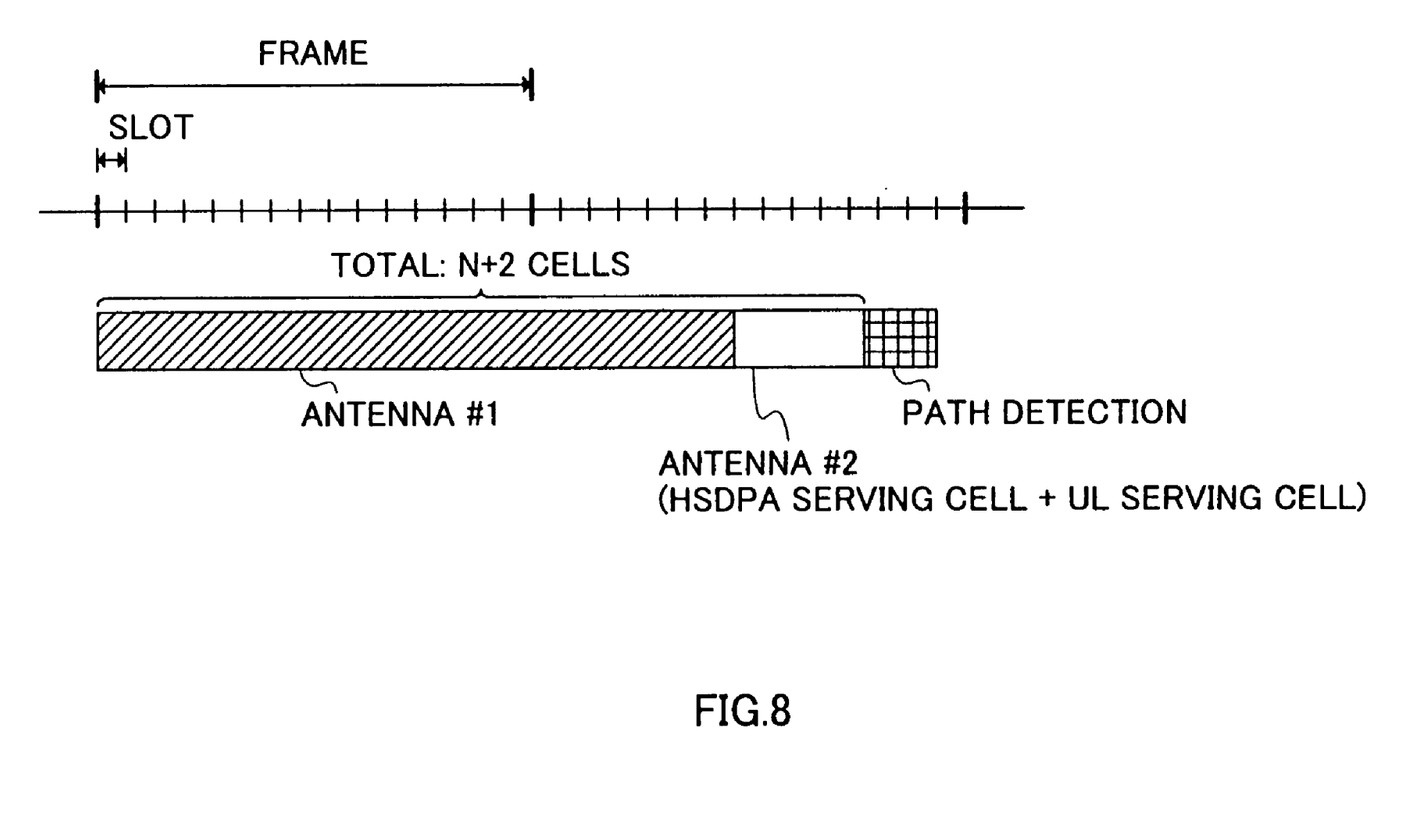
FIG. 8 is a drawing showing the operation of a radio receiving apparatus according to Embodiment 4 of the present invention.

By providing N+2 resources in this way, further resources for two cells can be secured for performing diversity reception for an HSDPA serving cell and performing diversity reception for an uplink serving cell even when the total number of simultaneously connected cells has reached N, as shown in FIG. 8. Thus, in this embodiment, diversity reception can be performed for an HSDPA serving cell and an uplink serving cell at all times. As an HSDPA serving cell and uplink serving cell may not be the same, performing diversity reception at all times not only for an HSDPA serving cell but also for an uplink serving cell and improving the reception quality of a downlink signal from an uplink serving cell is useful.

Embodiment 5

Figure 9:
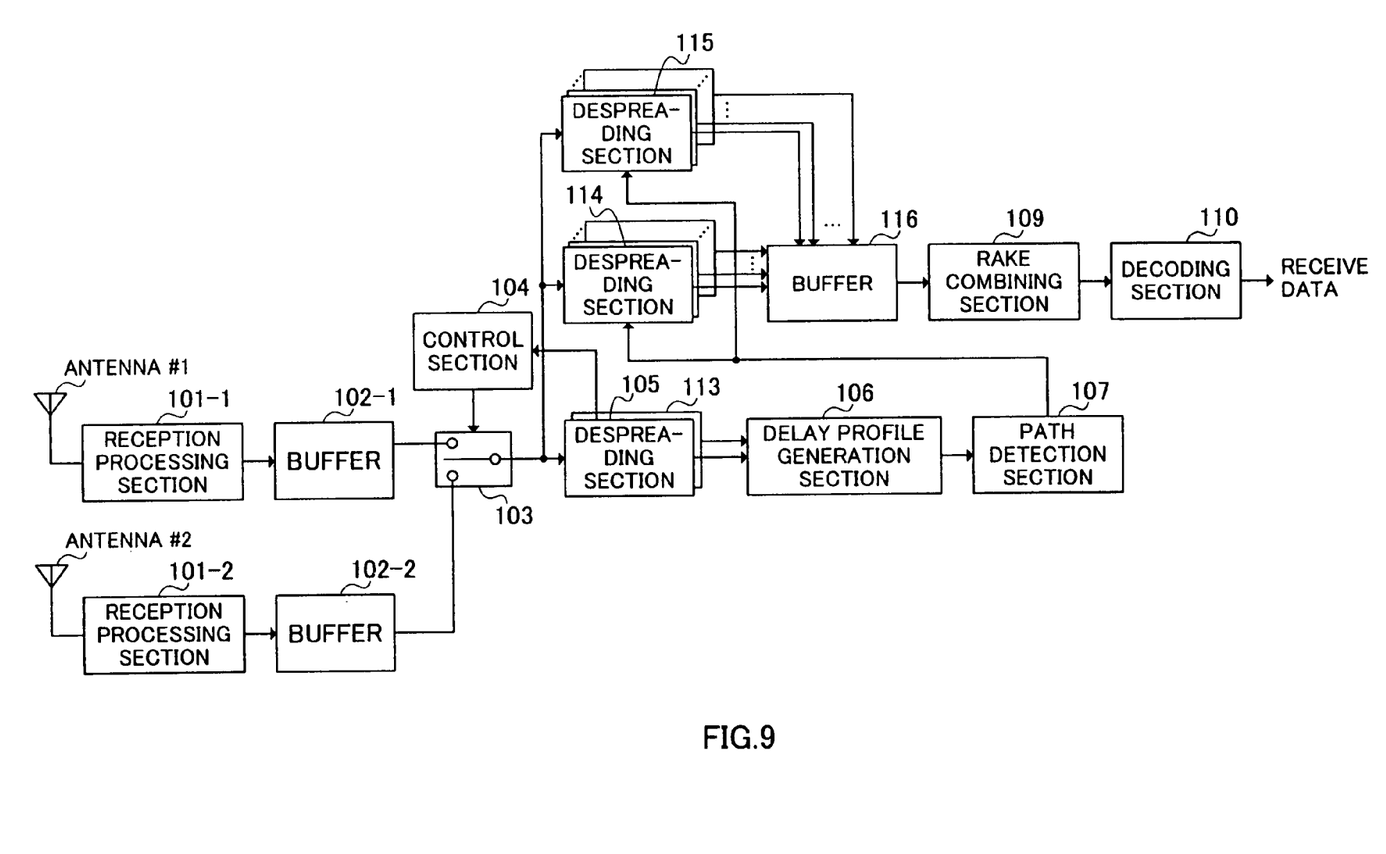
FIG. 9 is a block diagram showing the configuration of a radio receiving apparatus according to Embodiment 5 of the present invention.

FIG. 9 is a block diagram showing the configuration of a radio receiving apparatus according to Embodiment 5 of the present invention. Parts in FIG. 9 identical to those of Embodiment 1 (FIG. 1) are assigned the same codes as in Embodiment 1 (FIG. 1) and descriptions thereof are omitted.

In MBMS (Multimedia Broadcast/Multicast Service), optimal transmission power control is not performed according to the propagation path conditions of each mobile station apparatus, and therefore reception quality at a mobile station apparatus may degrade, and MBMS may not be provided appropriately. Thus, in this embodiment, a despreading section 113 is provided in addition to despreading section 105 in the synchronization processing section, as shown in FIG. 9, so that synchronization processing is made possible for a second-branch MBMS cell signal in addition to the simultaneously connected N cells. That is to say, N+1 resources are provided.

Here, MBMS is a service that performs Point to Multi (P-to-M) communication rather than Point to Point (P-to-P) communication. That is to say, in MBMS, a single base station apparatus simultaneously transmits the same information to a plurality of mobile station apparatuses. MBMS includes a Broadcast Mode and Multicast Mode. In Broadcast Mode, information is transmitted to all mobile stations as in current radio broadcasting, whereas in Multicast Mode, information is transmitted to specific mobile stations subscribing to the service, such as a news group. A cell that performs this kind of MBMS is called an MBMS cell.

Figure 10:
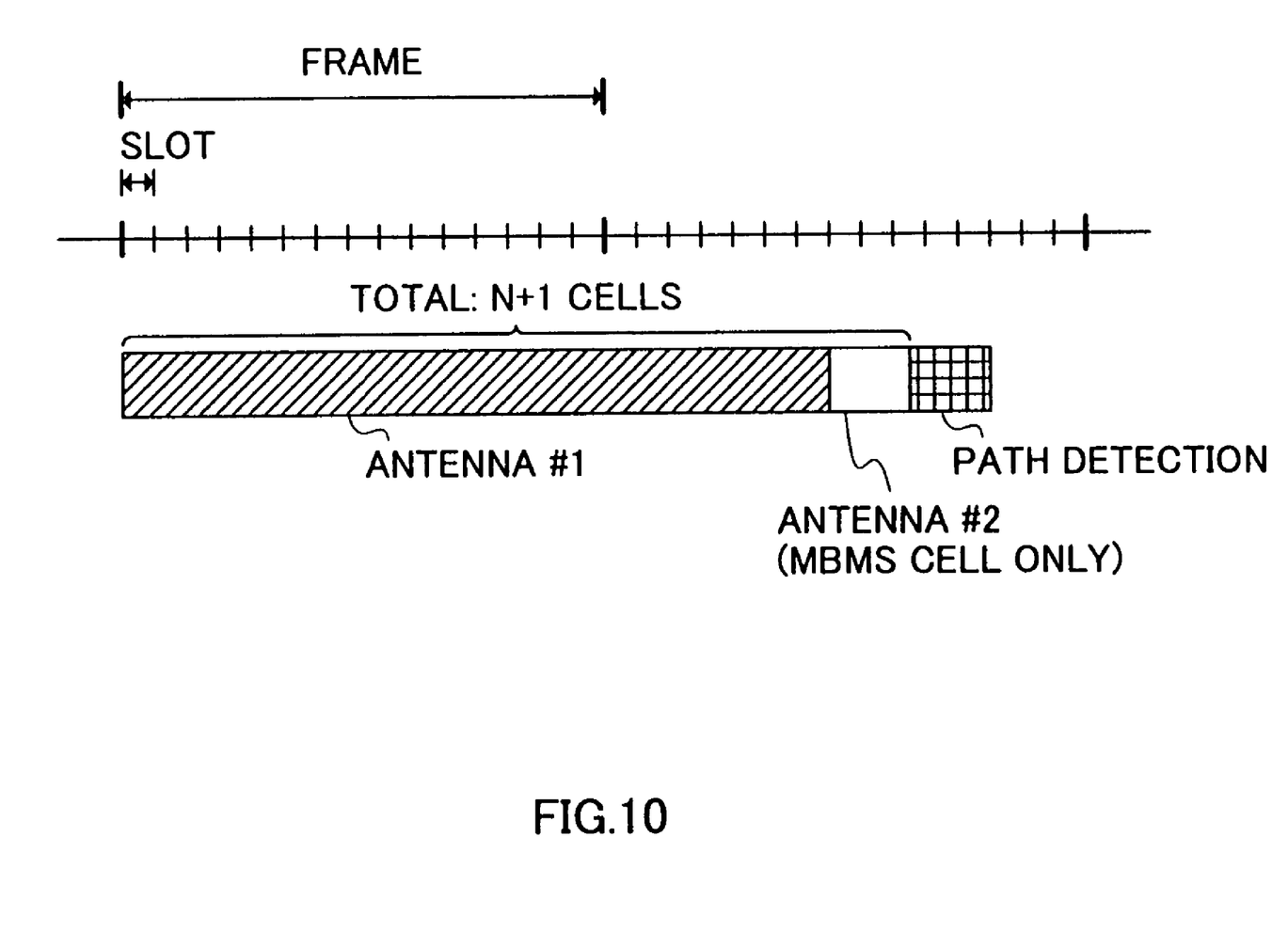
FIG. 10 is a drawing showing the operation of a radio receiving apparatus according to Embodiment 5 of the present invention.

By providing N+1 resources in this way, further resources for one cell can be secured for performing diversity reception for an MBMS cell even when the total number of simultaneously connected cells has reached N, as shown in FIG. 10. Thus, in this embodiment, diversity reception can be performed for an MBMS cell at all times, and good Multimedia Broadcast/Multicast Service reception quality can be maintained.

Also provided in this embodiment are despreading sections 114 for MBMS cell DPCH signal, despreading sections 115 for SCCPCH (Secondary Common Control Physical Channel) signals in which MBMS information is transmitted, and a buffer 116 that stores signals after despreading. Despreading sections 114 and despreading sections 115 perform despreading in accordance with the timing of a path location detected by path detection section 107. By this means, it is possible to perform modulation providing for diversity reception for DPCH signal and SCCPCH signal in MBMS cell.

The number of despreading sections 114 for DPCH signal and the number of despreading sections 115 for SCCPCH signal need not be the same. The reason for this is that, while DPCH signals are basically transmitted from all communicating cells simultaneously and there are consequently many DPCH signal path candidates, MBMS SCCPCH signals are transmitted from only one or a few cells and there are consequently few SCCPCH signal path candidates.

Taking the DPCH signal processing load, etc., into consideration, it is also possible expressly not to perform modulation providing for diversity reception for DPCH signals, but to perform modulation providing for diversity reception only for SCCPCH signals. In this case, a DPCH signal path is detected only from a delay profile generated from an antenna #1 received signal, and an SCCPCH signal path is detected from both a delay profile generated from an antenna #1 received signal and a delay profile generated from an antenna #2 received signal.

In above Embodiments 1 through 5, an HSDPA serving cell, uplink serving cell, and MBMS cell are reported to a mobile station apparatus incorporating an above-described radio receiving apparatus after being determined at a higher network level based on the mobile station apparatus's RL (RadioLink) connection situation and mobile station apparatus reception level measurement results.

Possible selection methods for an RL for which diversity reception is performed include, in addition to selecting an HSDPA serving cell, uplink serving cell, and MBMS cell as in Embodiments 1 through 5, selecting in order from an RL with good reception quality (DPCH signal SIR (Signal to Interference Ratio), CPICH signal SIR, total path power, or the like), or selecting in order from the RL with the best reception quality after combining when diversity reception is performed.

In above Embodiments 1 through 5, a configuration may be used whereby, with regard to reception processing for a control channel used for a cell search, etc., either only antenna #1 or only antenna #2 is used in a fixed mode and diversity reception is not performed. In this case, diversity reception is still performed for a traffic channel. In a mobile communication system, there is a mix of mobile station apparatuses that incorporate a radio receiving apparatus as described in Embodiments 1 through 5 and can perform diversity reception, and mobile station apparatuses that cannot perform diversity reception. As a base station apparatus or control station apparatus cannot ascertain whether or not a particular mobile station apparatus can perform diversity reception, in order to have a control channel received in the same state by all mobile station apparatuses, it is necessary to perform control adapted to mobile station apparatuses that cannot perform diversity reception. That is to say, diversity reception is not applied to a control channel in a mobile communication system. Therefore, diversity reception is not performed for a control channel even for a mobile station apparatus that is capable of diversity reception.

As described above, according to the present invention it is possible to perform diversity reception efficiently without increasing the scale of the apparatus.

This application is based on Japanese Patent Application No. 2003-182941 filed on Jun. 26, 2003, and Japanese Patent Application No. 2003-320997 filed on Sep. 12, 2003, the entire content of which is expressly incorporated by reference herein.

INDUSTRIAL APPLICABILITY

The present invention is applicable to a mobile station apparatus in a mobile communication system or the like.

The invention claimed is:

1. A radio receiving apparatus comprising:
   a first antenna and a second antenna;
   a synchronization processing section that despreads a received signal to obtain a despreading result and generates a delay profile based on the despreading result, and performs path detection based on the delay profile; and
   a combining section that combines a plurality of signals obtained by despreading said received signal in accordance with a location of the detected path;
   wherein said synchronization processing section:
   when a number of simultaneously connected cells has reached a simultaneously connectable number, performs a first processing that performs despreading and delay profile generation for said cells using a first received signal received by said first antenna, and then performs path detection of said first received signal; and when the number of simultaneously connected cells has not reached the simultaneously connectable number, performs said first processing and a second processing that performs despreading and delay profile generation using a second received signal received by said second antenna, and then performs path detection of both said first received signal and said second received signal.

2. The radio receiving apparatus according to claim 1, wherein:

said synchronization processing section, when the number of simultaneously connected cells has not reached the simultaneously connectable number, performs said second processing after performing said first processing.

3. The radio receiving apparatus according to claim 1, wherein said synchronization processing section, when the number of simultaneously connected cells has not reached the simultaneously connectable number, performs said second processing on a High Speed Downlink Packet Access (HSDPA) signal included in said second received signal.

4. The radio receiving apparatus according to claim 1, wherein said synchronization processing section, when the number of simultaneously connected cells has not reached the simultaneously connectable number, performs said first processing and said second processing within a total processing time of the simultaneously connectable number of cells.

5. The radio receiving apparatus according to claim 1, wherein said synchronization processing section, when the number of simultaneously connected cells has not reached the simultaneously connectable number, assigns to fingers the a greater number of paths than a number of paths assigned to fingers when the number of simultaneously connected cells has reached the simultaneously connectable number.

6. The radio receiving apparatus according to claim 1, further comprising a gain control section that performs an automatic gain control using a gain value common to both said first received signal and said second received signal.

7. The radio receiving apparatus according to claim 6, wherein said gain control section finds said gain value based on a larger reception power of a reception power of said first received signal and a reception power of said second received signal.

8. A mobile station apparatus equipped with the radio receiving apparatus according to claim 1.

* * * * *